(12) United States Patent
Shimada et al.

(10) Patent No.: US 11,201,950 B2
(45) Date of Patent: Dec. 14, 2021

(54) NON-TRANSITORY COMPUTER-READABLE RECORDING MEDIUM FOR TERMINAL DEVICE

(71) Applicant: Brother Kogyo Kabushiki Kaisha, Nagoya (JP)

(72) Inventors: Yusuke Shimada, Owariasahi (JP); Hirotaka Asakura, Nagoya (JP); Hiroshi Shibata, Yatomi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 221 days.

(21) Appl. No.: 16/681,901

(22) Filed: Nov. 13, 2019

(65) Prior Publication Data

US 2020/0084297 A1    Mar. 12, 2020

Related U.S. Application Data

(63) Continuation of application No. 15/897,826, filed on Feb. 15, 2018, now Pat. No. 10,511,693.

(30) Foreign Application Priority Data

Feb. 17, 2017 (JP) .............................. JP2017-028320

(51) Int. Cl.
*H04L 29/08* (2006.01)
*H04W 76/15* (2018.01)
(Continued)

(52) U.S. Cl.
CPC ............ *H04L 67/34* (2013.01); *G06F 3/1204* (2013.01); *G06F 3/1236* (2013.01); *G06F 3/1292* (2013.01); *H04W 8/005* (2013.01); *H04W 12/06* (2013.01); *H04W 76/15* (2018.02); *G06F 3/122* (2013.01); *G06F 3/1203* (2013.01); *H04W 12/43* (2021.01)

(58) Field of Classification Search
CPC ..... G06F 3/1292; G06F 3/1236; H04L 67/34; H04W 76/15; H04W 12/06
See application file for complete search history.

(56) References Cited

U.S. PATENT DOCUMENTS 7,213,060 B2 * 5/2007 Kemp ...................... H04L 29/06
709/222
2004/0227973 A1 * 11/2004 Taylor ................... G06F 3/1285
358/1.15

(Continued)

*Primary Examiner* — Douglas B Blair
(74) *Attorney, Agent, or Firm* — Banner & Witcoff, Ltd.

(57) ABSTRACT

A terminal device may display a first screen including a first button, send a first request including a search command to a communication device by using a first wireless connection in a case where the first button is selected, display a second screen including a second button in a case where a first response including one or more identification information is received from the communication device by using the first wireless connection, and send a second request including wireless setting information and a connection command to the communication device by using the first wireless connection in a case where the second button is selected. The connection command may be for causing the communication device to establish a second wireless connection by using the wireless setting information.

17 Claims, 6 Drawing Sheets

(51) Int. Cl.
    *H04W 8/00*     (2009.01)
    *G06F 3/12*     (2006.01)
    *H04W 12/06*    (2021.01)
    *H04W 12/43*    (2021.01)

(56) References Cited

U.S. PATENT DOCUMENTS

| | | | |
|---|---|---|---|
| 2005/0060649 A1* | 3/2005 | Kimura | G06F 3/1286 715/274 |
| 2010/0182633 A1* | 7/2010 | Wu | G06F 3/1228 358/1.15 |
| 2011/0099264 A1* | 4/2011 | Chapin | H04L 41/12 709/224 |
| 2011/0128389 A1* | 6/2011 | Maeda | H04N 21/6162 348/207.1 |
| 2011/0199640 A1* | 8/2011 | Shirai | G06F 3/129 358/1.15 |
| 2012/0297306 A1* | 11/2012 | Hassan | H04W 76/14 715/735 |
| 2013/0077568 A1* | 3/2013 | Mizutani | H04W 48/20 370/328 |
| 2013/0081121 A1* | 3/2013 | Green | H04W 12/50 726/7 |
| 2015/0124791 A1* | 5/2015 | Mazandarany | H04W 76/11 370/338 |
| 2017/0026834 A1* | 1/2017 | Nakajima | H04W 12/50 |
| 2017/0070951 A1* | 3/2017 | Takeuchi | H04W 48/20 |
| 2017/0123739 A1* | 5/2017 | Konji | H04W 60/005 |
| 2017/0215069 A1* | 7/2017 | Nakajima | H04L 63/0823 |
| 2017/0265194 A1* | 9/2017 | Ogawa | H04W 72/0453 |
| 2017/0265236 A1* | 9/2017 | Ogawa | H04W 76/25 |
| 2018/0352591 A1* | 12/2018 | Maki | H04W 76/30 |

* cited by examiner

FIG. 5
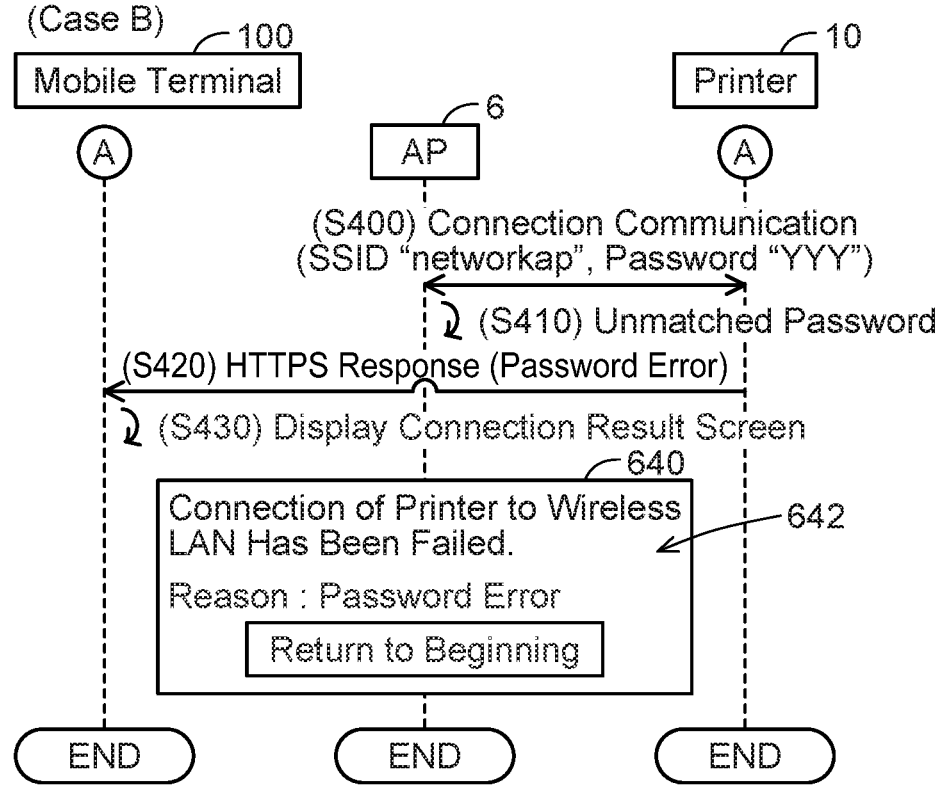
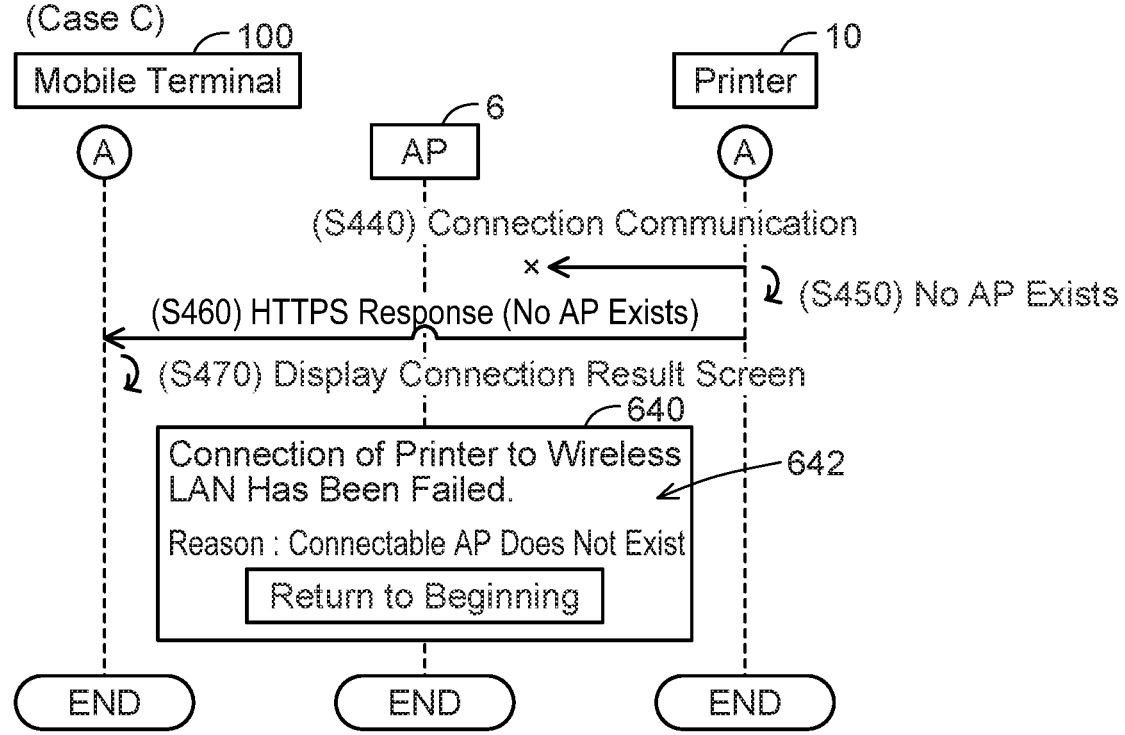

ical media/nd# NON-TRANSITORY COMPUTER-READABLE RECORDING MEDIUM FOR TERMINAL DEVICE

CROSS-REFERENCE TO RELATED APPLICATIONS

This application is a continuation of U.S. application Ser. No. 15/897,826, filed on Feb. 15, 2018, which claims priority from Japanese Application No. 2017-028320, filed on Feb. 17, 2017.

TECHNICAL FIELD

The teachings herein disclose a technique for establishing a wireless connection between a communication device and an access point by using a terminal device.

BACKGROUND ART

A host device acquires an instruction set from a server through a link, and uses the instruction set to send wireless authentication information to a peripheral device for establishing a wireless connection with an access point. As a result, the peripheral device can establish the wireless connection with the access point using the wireless authentication information.

SUMMARY

There may be a case where the instruction set is for example a dedicated application for establishing a wireless connection between the peripheral device and the access point, and the host device installs such a dedicated application therein.

The teachings herein provide a technique that may establish a wireless connection between a communication device and a target access point by using a general-purpose browser program, without the need for a terminal device to install a dedicated application.

A non-transitory computer-readable recording medium storing computer-readable instructions having a format interpretable by a browser program of a terminal device is disclosed herein. The computer-readable instructions, when executed by the browser program, may cause the terminal device to: control a display unit of the terminal device to display a first screen including an establishment message and a first button, the establishment message being for prompting to establish a first wireless connection between the terminal device and a communication device, the first button being a button to be selected after the establishment of the first wireless connection; in a case where the first button in the first screen is selected after the establishment of the first wireless connection, send a first request to the communication device by using the first wireless connection, the first request being sent by using first address information of the communication device as destination, the first address information being included in the computer-readable instructions, the first request including a search command for causing the communication device to search for one or more access points existing around the communication device; in a case where a first response including one or more identification information is received from the communication device by using the first wireless connection after the first request has been sent, control the display unit to display a second screen including a designation area and a second button, the one or more identification information identifying one or more access points found as a result of the search, the designation area being for designating wireless setting information for establishing a second wireless connection between the communication device and a target access point, the designation area including an identification information designation area for designating target identification information, the target identification information identifying the target access point from among the one or more identification information, the second button being a button to be selected after the designation of the wireless setting information; and in a case where the second button in the second screen is selected after the designation of the wireless setting information, send a second request to the communication device by using the first wireless connection, the second request being sent by using the first address information of the communication device as destination, the first address information being included in the computer-readable instructions, the second request including the wireless setting information and a connection command, the wireless setting information including the designated target identification information, the connection command being for causing the communication device to establish the second wireless connection by using the wireless setting information.

The terminal device itself and a method performed by the terminal device are also novel and useful. Further, a communication system including the terminal device and the communication device is also novel and useful.

BRIEF DESCRIPTION OF THE DRAWINGS

FIG. 5 shows a sequence diagram for cases B and C, in which the Wi-Fi connection establishment between the printer and the access point fails.

EMBODIMENTS (System Configuration; FIG. 1)

As shown in FIG. 1, a communication system 2 includes a printer 10, a mobile terminal 100, and a server 200. The mobile terminal 100 already has a Wi-Fi connection with an access point (hereinbelow termed "AP" (abbreviation for Access Point)) 6 established. Since the AP 6 is connected to the Internet 4, the mobile terminal 100 can execute communication with the server 200 on the Internet 4 through the AP 6. Further, in this embodiment, the mobile terminal 100 establishes a Wi-Fi connection between the AP 6 and the printer 10 by sending wireless setting information for establishing the Wi-Fi connection with the AP 6 to the printer 10.

(Configuration of Printer 10)

Figure 1:
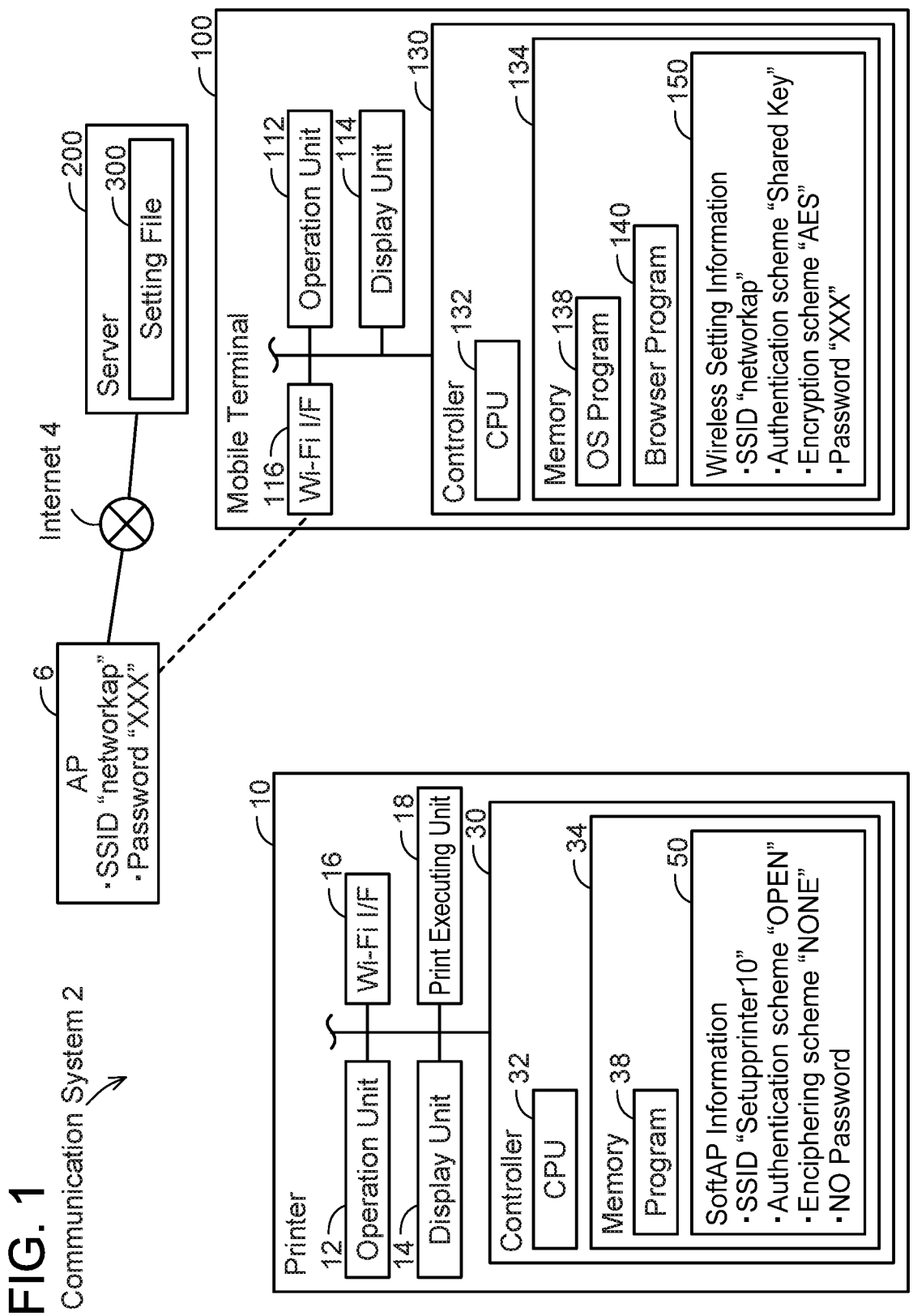
FIG. 1 shows a configuration of a communication system.

The printer 10 includes an operation unit 12, a display unit 14, a Wi-Fi interface 16, a print executing unit 18, and a controller 30. Respective units 12 to 30 are connected to a bus line (reference sign not given). Hereinbelow, the interface will be termed "I/F". The operation unit 12 includes a plurality of keys, and is configured to accept user operations. The display unit 14 is a display for displaying various types of information. The print executing unit 18 includes an ink jet type or laser type print mechanism.

The Wi-Fi I/F 16 is an I/F for executing a wireless communication according to a Wi-Fi scheme (hereinbelow termed "Wi-Fi communication"). The Wi-Fi scheme is a wireless communication scheme complying with the standard established by the Wi-Fi Alliance, and is a wireless communication scheme based for example on the standard of 802.11 of the IEEE (abbreviation of the Institute of Electrical and Electronics Engineers, Inc.), or other relevant standards (such as 802.11a, 11b, 11g, 11n, etc.) thereof. The Wi-Fi I/F 16 especially supports a SoftAP (abbreviation of Software Access Point) function. The Wi-Fi I/F 16 is capable of simultaneous execution of a wireless communication according to the SoftAP function (i.e., a wireless communication not using the AP 6), and a wireless communication using the AP 6.

The controller 30 includes a CPU 32 and a memory 34. The CPU 32 executes various processes according to a program 38. The memory 34 is configured of a ROM, a RAM, and the like. Further, the memory 34 stores SoftAP information 50, which is wireless setting information used in a wireless network created by the printer 10 operating as a SoftAP (hereinbelow termed "SoftAP NW"). The SoftAP information 50 may be stored in advance in the memory 34 before the printer 10 is shipped, or may for example be installed in the memory 34 from a server on the Internet after the printer 10 had been shipped. The SoftAP information 50 includes an SSID (abbreviation of Service Set Identifier) "setupprinter10". This SSID is an identifier for identifying the SoftAP NW. The SoftAP information 50 further includes "OPEN" as its authentication scheme, and includes "NONE" as its encryption scheme. As above, since the authentication scheme is "OPEN", no authentication is executed on the SoftAP NW, and since the encryption scheme is "NONE", no encryption communication is executed on the SoftAP NW. Thus, the SoftAP information 50 does not include a password that would be required for authentication and encryption communication.

(Configuration of Mobile Terminal 100)

The mobile terminal 100 is a carriable terminal device, such as a cell phone (e.g., a smart phone), a PDA, a laptop PC, a tablet PC, a mobile music player, a mobile movie player, and the like. However, in a variant, a stationary terminal device (e.g., a desktop PC) may be used instead of the mobile terminal 100. The mobile terminal 100 includes an operation unit 112, a display unit 114, a Wi-Fi I/F 116, and a controller 130. The respective units 112 to 130 are connected to a bus line (reference sign not given).

The operation unit 112 includes a plurality of keys. A user can input various instructions to the mobile terminal 100 by operating the operation unit 112. The display unit 114 is a display for displaying various types of information. The display unit 114 functions also as a so-called touch panel (i.e., it functions as an operation unit as well).

The Wi-Fi I/F 116 is an I/F for executing a Wi-Fi communication. The Wi-Fi I/F 116 may or may not support the SoftAP function. The Wi-Fi I/F 116 establishes a Wi-Fi connection with the AP 6, as a result of which the mobile terminal 100 participates in a wireless network formed by the AP 6 (hereinbelow termed "normal AP NW"). Wireless setting information used in the normal AP NW includes an SSID "networkap" and a password "XXX". The wireless setting information used in the normal AP NW has a higher security level than the authentication scheme "OPEN" and the encryption scheme "NONE" used in the aforementioned SoftAP NW. For example, an authentication scheme in which authentication is executed, such as "Shared Key", "WPA-EAP (or PSK)", and the like is employed. Further, for example, an encryption scheme in which encryption communication is executed, such as "AES", "TKIP", and the like is employed.

The controller 130 includes a CPU 132 and a memory 134. The CPU 132 executes various processes according to programs 138, 140 stored in the memory 134. The memory 134 is configured of a volatile memory, a non-volatile memory, and the like. The memory 134 stores not only the OS program 138 for implementing basic operation of the mobile terminal 100, but also the browser program 140. The browser program 140 is general-purpose data browsing software, such as IE (abbreviation of Internet Explorer (registered trademark)), Safari (registered trademark), GoogleChrome (registered trademark), and the like. Further, the memory 134 stores the wireless setting information 150 (i.e., the SSID "networkap", the password "XXX", etc.) used in the normal AP NW.

(Configuration of Server 200)

The server 200 is installed on the Internet 4 by a vendor of the printer 10. The server 200 stores a setting file 300 (see FIG. 6) to be installed to the mobile terminal 100.

The setting file 300 includes various commands for sending the wireless setting information used in the normal AP NW from the mobile terminal 100 to the printer 10 to establish a Wi-Fi connection between the printer 10 and the AP 6. Especially, the setting file 300 is described in a markup language that the browser program 140 of the mobile terminal 100 can interpret, and in this embodiment, this language is HTML (abbreviation of Hyper Text Markup Language). However, in a variant, this language may be other language such as XML (abbreviation of eXtensible Markup Language) or the like. Further, commands in the setting file 300 are described according to JavaScript (registered trademark).

(Processes Executed by Devices 10, 100; FIGS. 2 to 5)

Next, processes to be executed by the devices 10, 100 will be described with reference to FIGS. 2 to 5. Hereinbelow, for easier understanding, the description regarding the processes executed by the CPUs 32, 132 of the devices 10, 100 according to the programs 38, 138, 140 will be described with the devices (that is, the printer 10 and the mobile terminal 100) as the subject of the action instead of clearly indicating the CPUs as the subject of the action. Further, all communications hereinbelow are executed through the Wi-Fi I/F 16 (or 116), and as such, the clear indication of the communication being executed "through the Wi-Fi I/F 16 (or 116)" will be omitted.

Figure 2:
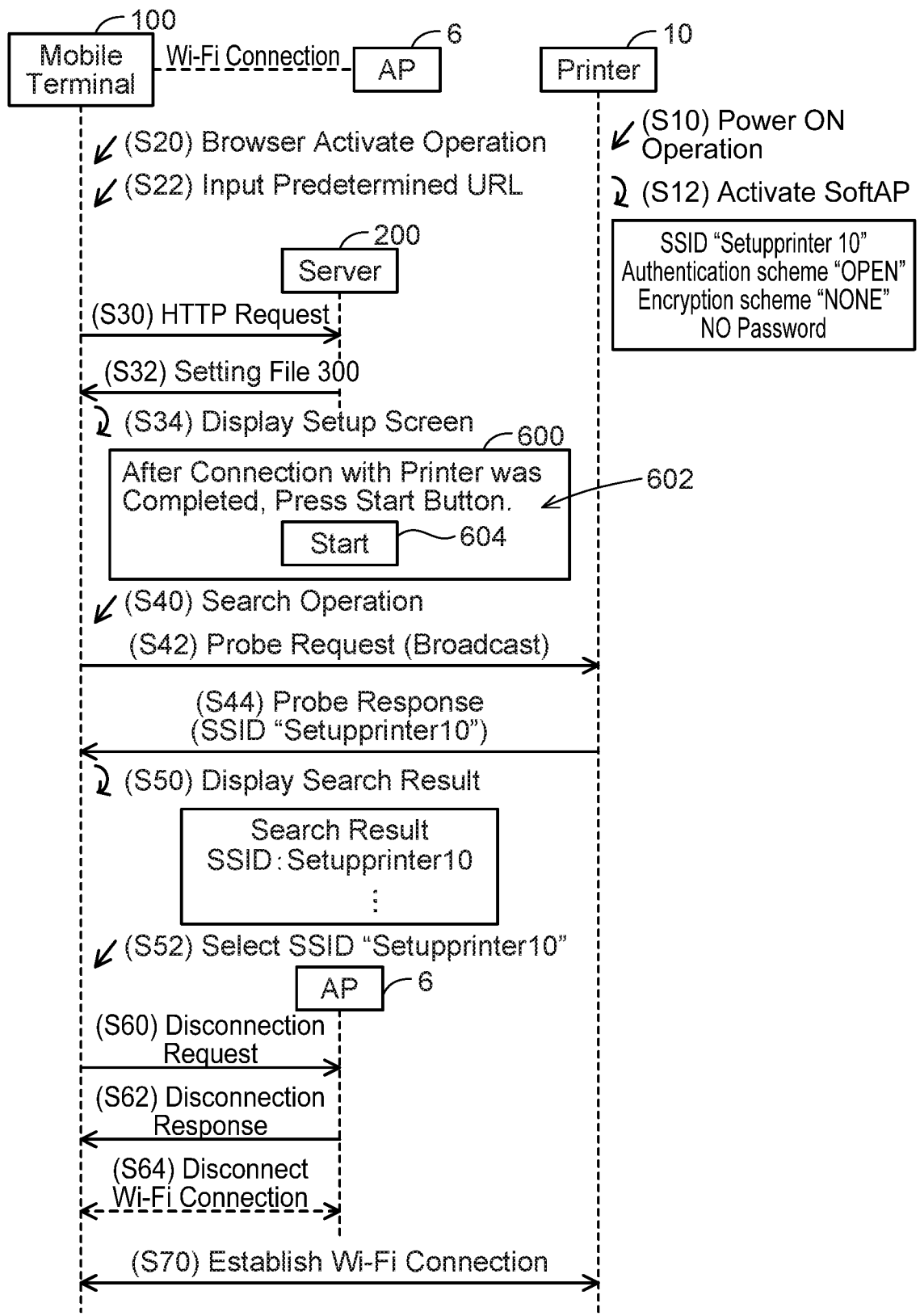
FIG. 2 shows a sequence diagram showing processes executed by respective devices.

(Process to Establish Wi-Fi Connection According to SoftAP; FIG. 2)

Firstly, with reference to FIG. 2, a process to establish a Wi-Fi connection between the printer 10 and the mobile terminal 100 according to the SoftAP will be described. In this embodiment, a situation is assumed in which the user has newly purchased the printer 10, and wishes to establish the Wi-Fi connection between the printer 10 and the AP 6, which is installed in user's house or workplace.

In S10, when the user performs an operation to turn on power of the printer 10, the power of the printer 10 is turned on. At this occasion, in S12, the printer 10 automatically activates the SoftAP to form a SoftAP NW, and starts operating as a parent station of the SoftAP NW (i.e., as the SoftAP). Since the SoftAP is automatically activated according to the operation to turn the power on, the user does not have to perform operations for activating the SoftAP after having performed the operation to turn the power on, as a result of which user's convenience can be improved. It should be noted that, although the printer 10 automatically activates the SoftAP when the power is initially turned on after shipping (S12), once the wireless setting information 150 for establishing the Wi-Fi connection with the AP 6 is stored in the memory 34, it does not automatically activate the SoftAP even when the power is thereafter turned on.

In S20, the user performs an operation for browser activation on the mobile terminal 100 to activate the browser program 140. In this case, the mobile terminal 100 displays a home screen on the display unit 114 according to the browser program 140. For example, a user's manual shipped with the printer 10 describes a URL (abbreviation of Uniform Resource Locator) indicating a location of the server 200. In S22, the user inputs this URL to the mobile terminal 100. In S30, the mobile terminal 100 sends an HTTP (abbreviation of Hyper Text Transfer Protocol) request according to the browser program 140 and designating the URL of the server 200 inputted in S30 as destination. As a result, in S32, the mobile terminal 100 receives the setting file 300 from the server 200.

The respective processes as below to be executed by the mobile terminal 100 include processes realized by the browser program 140 executing the setting file 300 (e.g., S34), and processes realized by the OS program 138 without using the browser program 140 (e.g., S42). Hereinbelow, the former processes will be described as "according to the browser program 140", and the latter processes will be described as "according to the OS program 138".

Figure 6:
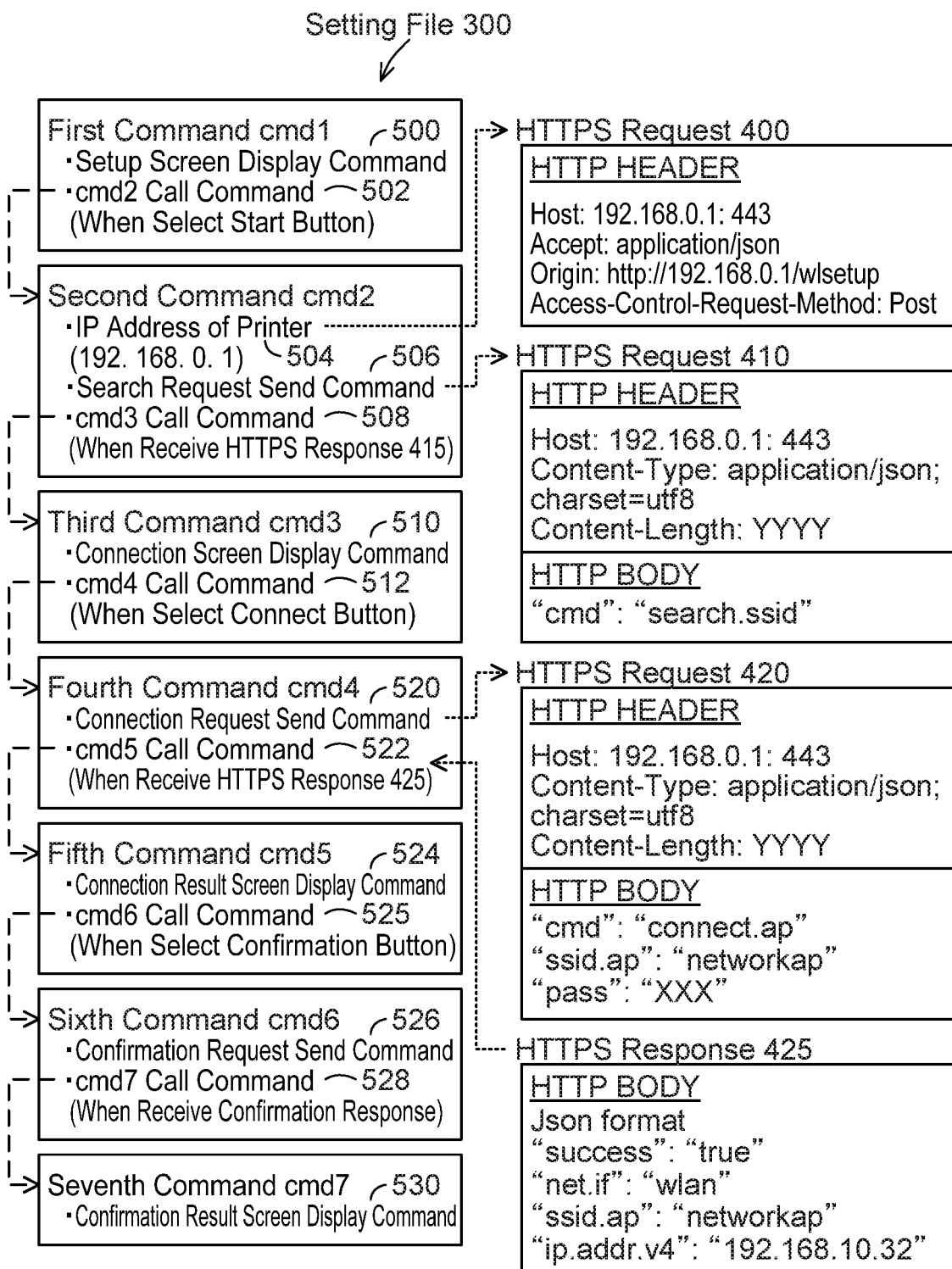
FIG. 6 shows an example of a setting file, HTTPS requests, and HTTPS responses.

FIG. 6 shows an example of commands in the setting file 300. The setting file 300 includes first to seventh commands cmd1 to cmd7, and each of these commands cmd1 to cmd7 includes various other commands 500, 502, and the like. Firstly, in S34, the mobile terminal 100 displays a setup screen 600 on the display unit 114 according to the command 500 in the first command cmd1. The setup screen 600 includes an establishment message 602 prompting to establish a Wi-Fi connection between the mobile terminal 100 and the printer 10, and a start button 604 to be selected after establishing the Wi-Fi connection.

In S40, the user firstly performs a search operation on the mobile terminal 100 for searching a connectable printer 10 existing around the mobile terminal 100 according to the establishment message 602. In this case, in S42, the mobile terminal 100 broadcasts a Probe request according to the OS program 138. As a result, in S44, the mobile terminal 100 receives a Probe response including an SSID "Setupprinter10" from the printer 10.

In S50, the mobile terminal 100 displays a search result including the SSID "Setupprinter10" included in the Probe response on the display unit 114 according to the OS program 138. In a case where the mobile terminal 100 receives a Probe response from a device different from the printer 10 (e.g., the AP 6, etc.), this search result further includes an SSID in this Probe response as well. Here, the SSID "Setupprinter10" of a SoftAP NW to be formed by the printer 10 includes a letter string indicating a setup for establishing the Wi-Fi connection between the printer 10 and the AP 6 (e.g., "Setup") and a letter string unique to the printer 10 (e.g., "printer10"). Thus, the user can easily find the SSID "Setupprinter10" from among the search results, as a result of which the SSID "Setupprinter10" is selected in S52.

Next, the mobile terminal 100 sends a disconnection request to the AP 6 in S60 according to the OS program 138, and in S62, it receives a disconnection response from the AP 6, as a result of which the Wi-Fi connection with the AP 6 is disconnected in S64. The mobile terminal 100 cannot establish the Wi-Fi connection with the printer 10 while maintaining a state in which the Wi-Fi connection with the AP 6 is connected. Due to this, the mobile terminal 100 disconnects the Wi-Fi connection with the AP 6 in S60 to S64.

In S70, the mobile terminal 100 establishes the Wi-Fi connection with the printer 10 according to the OS program 138. Specifically, the mobile terminal 100 sends a Probe request with the SSID "Setupprinter10" selected in S52 as destination, that is, with the printer 10 as the destination, and further executes communication of respective signals (such as an Authentication signal, an Association signal, and a 4-way handshake) with the printer 10. The SoftAP NW employs an authentication scheme "OPEN" and an encryption scheme "NONE", and authentication and encryption communications are not executed in the printer 10, so the mobile terminal 100 can easily establish the Wi-Fi connection with the printer 10.

Figure 3:
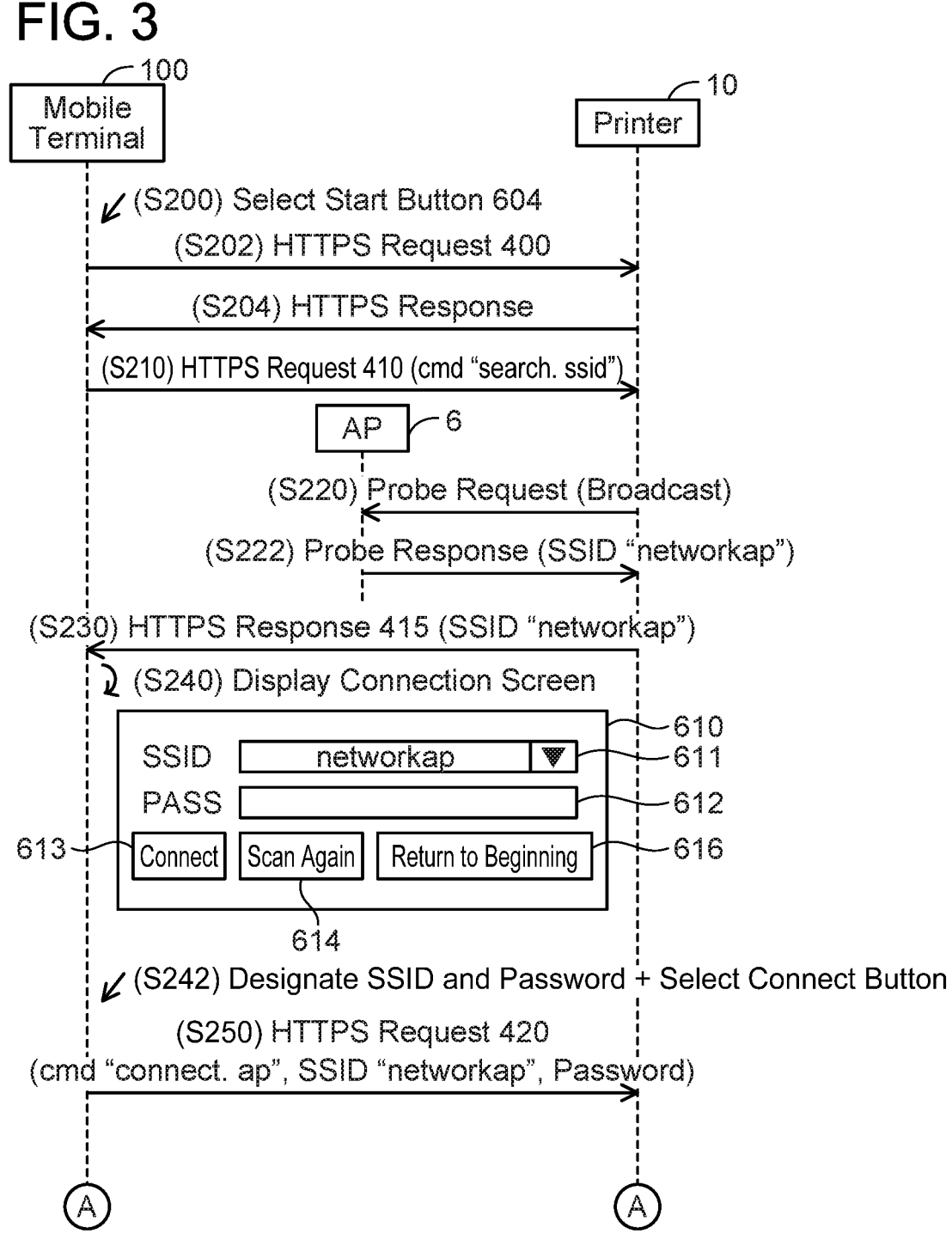
FIG. 3 shows a sequence diagram continued from FIG. 2.

(Process of Sending Normal AP NW SSID, Etc. To Printer 10; FIG. 3)

Next, with reference to FIG. 3, a process for the mobile terminal 100 to send an SSID "networkap" and a password "XXX" of the normal AP NW to the printer 10 will be described. From FIG. 3 and thereafter, almost all the processes executed by the mobile terminal 100 are processes realized by the browser program 140 executing the setting file 300. Due to this, the description of "according to the browser program 140" will be omitted, and "according to the OS program 138" will be indicated in the description only for processes realized by the OS program 138 without using the browser program 140.

After the Wi-Fi connection is established between the mobile terminal 100 and the printer 10 in S70 of FIG. 2, the user selects the start button 604 (see S34 in FIG. 2) in the setup screen 600 in S200 of FIG. 3. When the start button 604 is selected, the mobile terminal 100 calls the second command cmd2 according to the command 502 (see FIG. 6) in the first command cmd1 included in the setting file 300. The second command cmd2 includes a preset IP address 504 of the printer 10 (i.e., "192.168.0.1"). Due to this, the mobile terminal 100 can execute communication to be described later with the printer 10 using the IP address 504. The user does not need to input the IP address 504 of the printer 10, so convenience of the user is improved.

Since the second command cmd2 includes the IP address 504 of the printer 10, the mobile terminal 100 can recognize that a communication partner according to the browser program 140 should be changed from the server 200 (see S30, S32 of FIG. 2) to the printer 10. The mobile terminal 100 executes a so-called cross domain communication to change the communication partner. Specifically, in S202, the mobile terminal 100 sends an HTTPS (abbreviation of Hyper Text Transfer Protocol Secure) request 400 including the IP address 504 as destination to the printer 10. As shown in FIG. 6, the HTTPS request 400 includes a cross domain request for changing the communication partner from the server 200 to the printer 10 (i.e., "Access-Control-Request-Method: Post"). Further, in S204, the mobile terminal 100 receives an HTTPS response from the printer 10. Due to this, the cross domain is completed, and the mobile terminal 100 can suitably execute the communication with the printer 10 hereafter.

As aforementioned, the mobile terminal 100 executes a communication according to the HTTP in S30, S32 of FIG. 2 with the server 200. With respect to this, the mobile terminal 100 executes a communication according to the HTTPS with the printer 10 when the communication with the printer 10 is to be executed according to the respective commands in the setting file 300 (e.g., see S202). A communication according to the HTTPS has a higher security than the communication according to the HTTP. As will be described later, the mobile terminal 100 and the printer 10 communicate the SSID and the password of the normal AP NW, which are information with high confidentiality. The mobile terminal 100 can execute the highly secure communication according to the HTTPS with the printer 10, so the information with high confidentiality can be protected from being acquired by a third party.

Next, in S210, the mobile terminal 100 sends an HTTPS request 410 including the IP address 504 as destination to the printer 10 according to a command 506 in the second command cmd2. As shown in FIG. 6, the HTTPS request 410 includes a search command for causing the printer 10 to execute search of one or more APs existing around the printer 10 (i.e., ""cmd": "search. ssid"").

In S220, the printer 10 broadcasts a Probe request for searching the APs according to the search command in the HTTPS request 410. As a result, in S222, the printer 10 receives a Probe response including an SSID "networkap" from the AP 6.

In S230, the mobile terminal 100 receives an HTTPS response 415 from the printer 10, and this HTTPS response 415 includes the SSID "networkap" of the AP 6 that was found as a result of the aforementioned search. In a case where the printer 10 receives a Probe response from a device different from the AP 6, the HTTPS response 415 further includes an SSID in this Probe response as well. That is, the HTTPS response 415 includes one or more SSIDs including the SSID "networkap" of the AP 6. When the HTTPS response 415 is received from the printer 10, the mobile terminal 100 calls the third command cmd3 according to a command 508 in the second command cmd2 included in the setting file 300 (see FIG. 6).

In S240, the mobile terminal 100 displays a connection screen 610 on the display unit 114 according to a command 510 in the third command cmd3. The connection screen 610 includes designation areas 611, 612 for designating wireless setting information for establishing the Wi-Fi connection between the printer 10 and the AP 6, a connection button 613 to be selected after the designation of the wireless setting information, a "scan again" button 614, and a return button 616. The designation areas 611, 612 include an SSID designation area 611 and a password designation area 612. The SSID designation area 611 is an area for designating one SSID from among the one or more SSIDs included in the HTTPS response 415. The password designation area 612 is an area for designating the password. The "scan again" button 614 is a button for causing the printer 10 to execute the search for APs again. When the "scan again" button 614 is to be selected by the user, the mobile terminal 100 returns to S210. Further, when the return button 616 is to be selected by the user, the mobile terminal 100 returns to S34 of FIG. 2.

Since the user had already performed the operation for establishing the Wi-Fi connection between the mobile terminal 100 and the AP 6, the user already knows the SSID "networkap" of the AP 6 and the password "XXX". Due to this, in S242, the user can designate the SSID "networkap" of the AP 6 from among the one or more SSIDs in the SSID designation area 611, and also can normally designate the password "XXX" in the password designation area 612. However, it is possible that the user designates an incorrect password. In a variant, the Wi-Fi connection may not be established between the mobile terminal 100 and the AP 6. Further, in yet another variant, if the authentication scheme used by the AP 6 is "OPEN" and the encryption scheme thereof is "NONE", no password may be designated. The user selects the connection button 613 after the designation of the SSID "networkap" and the password. If the connection button 613 is selected, the mobile terminal 100 calls the fourth command cmd4 according to a command 512 in the third command cmd3 included in the setting file 300.

In S250, the mobile terminal 100 sends an HTTPS request 420 including the IP address 504 as destination to the printer 10 according to the command 520 in the fourth command cmd4. As shown in FIG. 6, the HTTPS request 420 includes the designated SSID "networkap", the designated password (which is "XXX" in the example of FIG. 6), and a connection command for causing the printer 10 to establish the Wi-Fi connection with the AP 6 (i.e., ""cmd": "connect.ap"").

Figure 4:
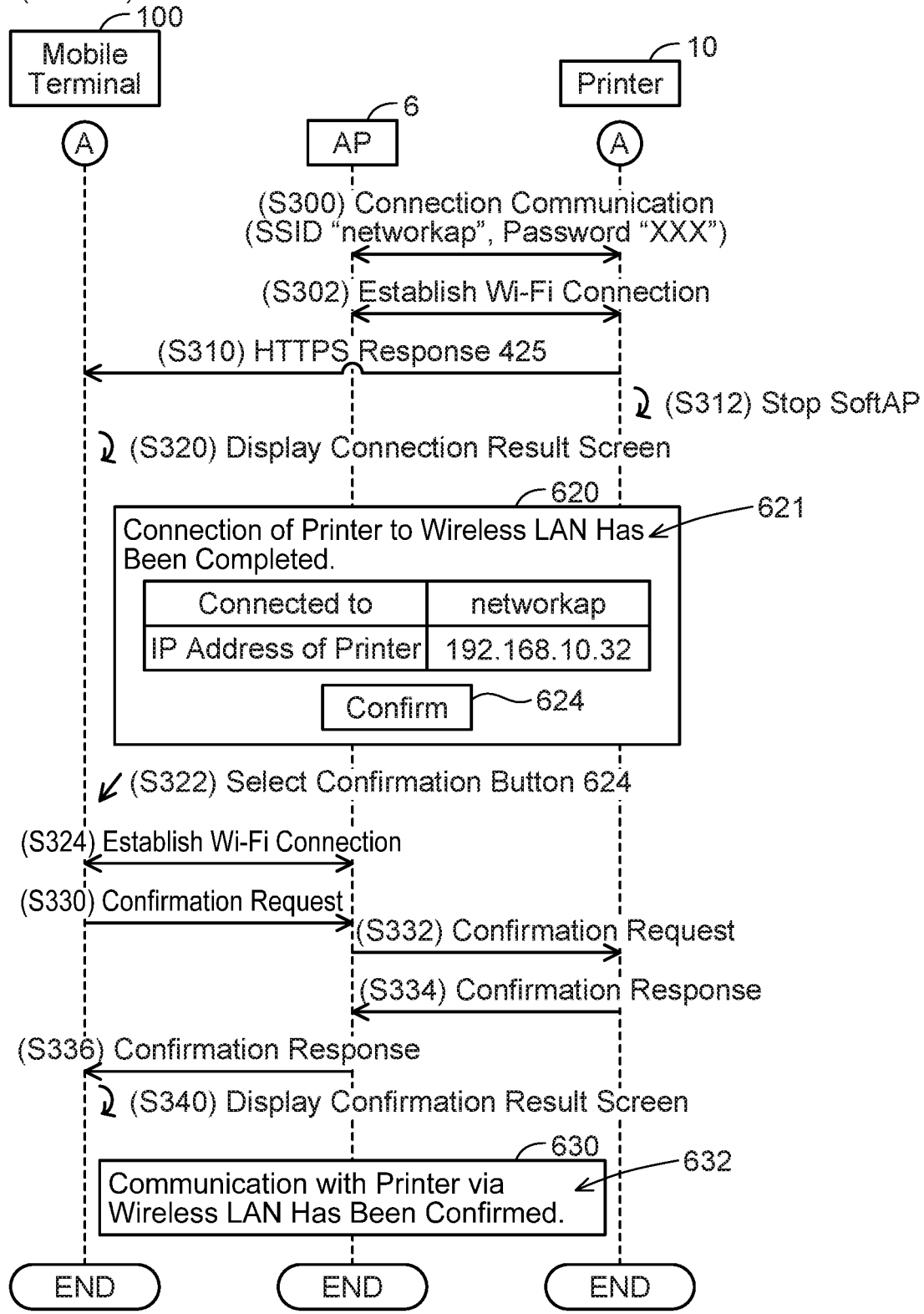
FIG. 4 shows a sequence diagram for a case A, in which a Wi-Fi connection establishment between a printer and an access point succeeds.

(Case A: FIG. 4)

Next, processes of a case A in which Wi-Fi connection establishment between the printer 10 and the AP 6 succeeds will be described with reference to FIG. 4. The processes of FIG. 4 are executed when the HTTPS request 420 including the correct password "XXX" is sent to the printer 10 in S250 of FIG. 3.

In S300, the printer 10 uses the SSID "networkap" and the password "XXX" in the HTTPS request 420 according to the connection command in the HTTPS request 420 to execute connection communication with the AP 6 to establish the Wi-Fi connection. Specifically, the printer 10 executes communication of respective signals (such as an Authentication signal, an Association signal, and a 4-way handshake) with the AP 6. In this process, the printer 10 sends the SSID "networkap" and the password "XXX" to the AP 6. The printer 10 is not aware of the authentication scheme and the encryption scheme of the AP 6 at the time when the HTTPS request 420 is received, however, it can acquire the authentication scheme and the encryption scheme of the AP 6 upon executing this connection communication with the AP 6. When the authentication of the printer 10 (i.e., the authentication of the password "XXX") succeeds in the AP 6, the Wi-Fi connection is established between the printer 10 and the AP 6 in S302. When the Wi-Fi connection is established, the printer 10 receives an IP address "192.168.10.32" of the printer 10 in the normal AP NW from the AP 6. This IP address "192.168.10.32" differs from the IP address "192.168.0.1" of the printer 10 included in the setting file 300 (see reference sign 504 in FIG. 6). Further, the printer 10 stores wireless setting information that is identical to the wireless setting information 150 (see FIG. 1) in the memory 34.

In S310, the printer 10 sends an HTTPS response 425 to the mobile terminal 100. As shown in FIG. 6, the HTTPS response 425 includes information indicating that the establishment of the Wi-Fi connection with the AP 6 has succeeded (i.e., ""success": "true""), information indicating the Wi-Fi I/F 16 that had established the Wi-Fi connection (i.e., ""net.if":"wlan""), the SSID "networkap" of the AP 6, and the IP address "192.168.10.32" of the printer 10 in the normal AP NW. Further, in S312, the printer 10 stops the SoftAP. As a result, the SoftAP NW disappears, and the Wi-Fi connection between the mobile terminal 100 and the printer 10 is disconnected.

When the HTTPS response 425 is received in S310, the mobile terminal 100 calls the fifth command cmd5 according to a command 522 (see FIG. 6) in the fourth command cmd4 included in the setting file 300. In S320, the mobile terminal 100 displays a connection result screen 620 on the display unit 114 according to a command 524 in the fifth command cmd5. The connection result screen 620 includes a success message 621 indicating that the establishment of the Wi-Fi connection between the printer 10 and the AP 6 has succeeded, the SSID "networkap" included in the HTTPS response 425, the IP address "192.168.10.32" of the printer 10 included in the HTTPS response 425, and a confirmation button 624. The confirmation button 624 is a button for executing confirmation communication with the printer 10 through the AP 6. In S322, the user selects the confirmation button 624. In this case, the mobile terminal 100 calls the sixth command cmd6 according to a command 525 (see FIG. 6) in the fifth command cmd5 in the setting file 300.

In S324, the mobile terminal 100 instructs the OS program 138 to execute confirmation communication according to the command 526 in the sixth command cmd6. Due to this, the mobile terminal 100 establishes the Wi-Fi connection with the AP 6 again according to the OS program 138 and by using the wireless setting information 150 in the memory 134.

Next, in S330 and S332, the mobile terminal 100, sends a confirmation request, which includes the IP address "192.168.10.32" included in the HTTPS response 425 as destination, through the AP 6 to the printer 10 according to a command 526 in the sixth command cmd6. As a result, in S334 and S336, the mobile terminal 100 receives a confirmation response through the AP 6 from the printer 10. When the confirmation response is received, the mobile terminal 100 calls the seventh command cmd7 according to a command 528 (see FIG. 6) in the sixth command cmd6 included in the setting file 300.

In S340, the mobile terminal 100 displays a confirmation result screen 630 on the display unit 114 according to a command 530 in the seventh command cmd7. The confirmation result screen 630 includes a success message 632 indicating that the communication with the printer 10 through the AP 6 has succeeded. Due to this, the user can acknowledge that both the mobile terminal 100 and the printer 10 are participating in the same normal AP NW.

(Case B: FIG. 5)

Next, processes of a case B in which the Wi-Fi connection establishment between the printer 10 and the AP 6 fails will be described with reference to FIG. 5. The processes of the case B are executed when the HTTPS request 420 including an incorrect password "YYY" is sent to the printer 10 in S250 of FIG. 3.

In S400 of FIG. 5, the printer 10 uses the SSID "networkap" and the password "YYY" in the HTTPS request 420 to execute the connection communication with the AP 6. As a result, in S410, the password authentication in the AP 6 does not succeed, so the printer 10 can recognize that the Wi-Fi connection establishment with the AP 6 has failed due to the unmatched password. As a result, in S420, the printer 10 sends an HTTPS response including information indicating a password error to the mobile terminal 100.

When the HTTPS response from the printer 10 is received in S420, the mobile terminal 100 calls the fifth command cmd5 according to the command 522 (see FIG. 6) in the fourth command cmd4 included in the setting file 300. Then, in S430, the mobile terminal 100 displays the connection result screen 640 on the display unit 114 according to the command 524 in the fifth command cmd5. This connection result screen 640 includes a failure message 642 indicating that the Wi-Fi connection establishment between the printer 10 and the AP 6 has failed and the password error is occurring. Due to this, the user can acknowledge that the Wi-Fi connection establishment had failed due to the password error, and for example, may select the return button in the connection result screen 640 to cause the mobile terminal 100 to execute the processes from S34 of FIG. 2 again. Then, the user can designate the correct password "XXX" in S240 of FIG. 3 to establish the Wi-Fi connection between the AP 6 and the printer 10.

(Case C)

Next, processes of a case C in which the Wi-Fi connection establishment between the printer 10 and the AP 6 fails will be described. In the case C, the HTTPS request 420 including the correct password "XXX" is sent to the printer 10 in S250 of FIG. 3, however, the Wi-Fi connection establishment fails due to being incapable of executing the communication between the printer 10 and the AP 6.

In S440, the printer 10 attempts the connection communication similar to S300 of FIG. 4, however, it cannot execute the communication with the AP 6 due to reasons such as being at a too far distance from the AP 6. As a result, in S450, the printer 10 determines that the AP 6 does not exist. Then, in S460, the printer 10 sends an HTTPS response including information indicating that no AP exists to the mobile terminal 100.

S470 is similar to S430 of the case B, except that a failure message 642 indicating that no AP exists is displayed. Due to this, the user can acknowledge that the Wi-Fi connection establishment failed because no AP had existed, and for example, the user may establish the Wi-Fi connection between the AP 6 and the printer 10 by bringing one of the AP 6 and the printer 10 closer to the other.

(Effects of Present Embodiment)

According to the present embodiment, the setting file 300 has a format interpretable by the browser program 140 of the mobile terminal 100, so the Wi-Fi connection between the printer 10 and the AP 6 can be established by the setting file 300 being executed by the browser program 140. Thus, the mobile terminal 100 can establish the Wi-Fi connection between the printer 10 and the AP 6 using the general-purpose browser program 140, without having have to install any dedicated application.

(Corresponding Relationships)

The mobile terminal 100 and the printer 10 are respectively an example of a "terminal device" and a "communication device". The setting file 300 is an example of "computer-readable instructions". The Wi-Fi connection in S70 of FIG. 2 and the Wi-Fi connection in S302 of FIG. 4 are respectively an example of a "first wireless connection" and a "second wireless connection". The setup screen 600, the connection screen 610, the connection result screen 620, and the confirmation result screen 630 are respectively an example of a "first screen", a "second screen", a "third screen", and a "fourth screen". The start button 604, the connection button 613, and the confirmation button 624 are respectively an example of a "first button", a "second button", and a "third button". The success message 621 and the success message 632 are respectively an example of a "first success message" and a "second success message". The SSID and the password designated in S242 of FIG. 3 are examples of "wireless setting information". The IP address "192.168.0.1" in the second command cmd2 and the IP address "192.168.10.32" in the HTTPS response 425 are respectively an example of "first address information" and "second address information". The HTTPS request 400, the HTTPS request 410, the HTTPS request 420, and the confirmation requests of S330, S332 of FIG. 4 are respectively an example of a "Cross-Domain request", a "first request", a "second request", and a "third request". The HTTPS response 415, HTTPS response 425, and the confirmation responses of S334, S336 of FIG. 4 are respectively an example of a "first response", a "second response", and a "third response".

(Variant 1)

In S12 of FIG. 2, the printer 10 may operate as a GroupOwner in a WFD (Wi-Fi Direct (abbreviation of registered trademark)) scheme instead of activating the SoftAP to form a wireless network. Further, in another variant, the printer 10 may not operate as a parent station of a wireless network (e.g., as the SoftAP or the GroupOwner), and the mobile terminal 100 may operate as such a parent station of the wireless network. Generally speaking, in the "first wireless connection", the parent station is not limited to the SoftAP, and whichever of the terminal device and the communication device may operate as the parent station.

(Variant 2)

S320 to S340 of FIG. 4 may be omitted. That is, "control the display unit to display a third screen", "send a third request", and "control the display unit to display a fourth screen" can be omitted.

(Variant 3)

In S32 of FIG. 2, the mobile terminal 100 may not receive the setting file 300 from the server 200. For example, the setting file 300 may be stored in the memory 34 of the printer 10 in advance. Further, the mobile terminal 100 may receive the setting file 300 from the printer 10 using the SoftAP NW.

(Variant 4)

The "communication device" is not limited to the printer 10, but may be a scanner, a multi-function device having printing function and other functions (e.g., scan function, FAX function, etc.), or may be other devices (e.g., PC, server, etc.).

(Variant 5)

In the respective embodiments as above, the processes of FIGS. 2 to 5 are implemented by software (i.e., program), however, at least one of these processes may be implemented by hardware such as a logic circuit.

What is claimed is:

1. A non-transitory computer-readable recording medium storing computer-readable instructions having a format interpretable by a browser program of a terminal device,
wherein the computer-readable instructions are received from a server storing the computer-readable instructions via the internet by the terminal device,
wherein the computer-readable instructions, when executed by the browser program, cause the terminal device to:
control a display unit of the terminal device to display a designation screen including a designation area and a button, the designation area being for designating wireless setting information for establishing a second wireless connection between a communication device different from the server and a target access point, the button being a button to be selected after the designation of the wireless setting information; and
in a case where the button in the designation screen is selected after the designation of the wireless setting information, send a request to the communication device by using a first wireless connection established between the terminal device and the communication device, the request being sent by using first address information of the communication device as a destination, the first address information being included in the computer-readable instructions, the request including the wireless setting information and a connection command, the connection command being for causing the communication device to establish the second wireless connection by using the wireless setting information.

2. The non-transitory computer-readable recording medium as in claim 1, wherein
the designation area further includes an identification information designation area for designating target identification information identifying the target access point, and a password designation area for designating a password,
the designated password is currently used in a wireless network formed by the target access point, and
the wireless setting information further includes the target identification information and the designated password.

3. The non-transitory computer-readable recording medium as in claim 1, wherein the computer-readable instructions, when executed by the browser program, further cause the terminal device to:
in a case where a response including success information indicating that the establishment of the second wireless connection has succeeded is received from the communication device by using the first wireless connection after the request has been sent, control the display unit to display a connection success screen including a first success message indicating that the establishment of the second wireless connection has succeeded.

4. The non-transitory computer-readable recording medium as in claim 3, wherein
the response further includes second address information of the communication device,
the second address information is used in a wireless network formed by the target access point,
the connection success screen further includes a button, and
the computer-readable instructions, when executed by the browser program, further cause the terminal device to:
in a case where the button in the connection success screen is selected, send a request to the communication device via the target access point by using the second address information as a destination, the second address information being included in the response; and
in a case where a response is received from the communication device via the target access point after the request has been sent to the communication device via the target access point by using the second address information as the destination, control the display unit to display a communication success screen including a second success message indicating that a communication with the communication device via the target access point has succeeded.

5. The non-transitory computer-readable recording medium as in claim 1, wherein
the computer-readable instructions are received from the server according to HTTP (abbreviation of Hyper Text Transfer Protocol) via the internet by the terminal device, and
the request is sent to the communication device according to HTTPS (abbreviation of HTTP Secure).

6. The non-transitory computer-readable recording medium as in claim 1, wherein the computer-readable instructions, when executed by the browser program, further cause the terminal device to:
send a Cross-Domain request to the communication device by using the first wireless connection before the request is sent to the communication device, the Cross-Domain request being sent by using the first address information of the communication device as the destination, the first address information being included in the computer-readable instructions, and the Cross-Domain request being for changing a communication partner of the terminal device from the server to the communication device.

7. The non-transitory computer-readable recording medium as in claim 1, wherein the computer-readable instructions are described according to Javascript.

8. The non-transitory computer-readable recording medium as in claim 1, wherein the computer-readable instructions are described according to a markup language.

9. A method performed by a terminal device, the method comprising:
receiving computer-readable instructions from a server via the internet; and
executing, by the terminal device, the computer-readable instructions to perform operations comprising:
controlling a display unit of the terminal device to display a designation screen including a designation area and a button, the designation area being for designating wireless setting information for establishing a second wireless connection between a communication device different from the server and a target access point, the button being a button to be selected after the designation of the wireless setting information; and
in a case where the button in the designation screen is selected after the designation of the wireless setting information, sending a request to the communication device by using a first wireless connection established between the terminal device and the communication device, the request being sent by using first address information of the communication device as a destination, the first address information being included in the computer-readable instructions, the request including the wireless setting information and a connection command, the connection command being for causing the communication device to establish the second wireless connection by using the wireless setting information.

10. The method of claim 9, wherein
the designation area further includes an identification information designation area for designating target identification information identifying the target access point, and a password designation area for designating a password,
the designated password is currently used in a wireless network formed by the target access point, and
the wireless setting information further includes the target identification information and the designated password.

11. The method of claim 9, wherein executing the computer-readable instructions further performs operations comprising:
in a case where a response including success information indicating that the establishment of the second wireless connection has succeeded is received from the communication device by using the first wireless connection after the request has been sent, controlling the display unit to display a connection success screen including a first success message indicating that the establishment of the second wireless connection has succeeded.

12. The method of claim 11, wherein
the response further includes second address information of the communication device,
the second address information is used in a wireless network formed by the target access point,
the connection success screen further includes a button, and
executing the computer-readable instructions further performs operations comprising:
in a case where the button in the connection success screen is selected, sending a request to the communication device via the target access point by using the second address information as a destination, the second address information being included in the response; and
in a case where a response is received from the communication device via the target access point after the request has been sent to the communication device via the target access point by using the second address information as the destination, controlling the display unit to display a communication success screen including a second success message indicating that a communication with the communication device via the target access point has succeeded.

13. The method of claim 9, wherein:
receiving the computer-readable instructions from the server includes receiving the computer-readable instructions according to HTTP (abbreviation of Hyper Text Transfer Protocol) via the internet, and
the request is sent to the communication device according to HTTPS (abbreviation of HTTP Secure).

14. The method of claim 9, wherein executing the computer-readable instructions further performs operations comprising:
sending a Cross-Domain request to the communication device by using the first wireless connection before the request is sent to the communication device, the Cross-Domain request being sent by using the first address information of the communication device as the destination, and the Cross-Domain request being for changing a communication partner of the terminal device from the server to the communication device.

15. The method of claim 9, wherein the computer-readable instructions are described according to Javascript.

16. The method of claim 9, wherein the computer-readable instructions are described according to a markup language.

17. A communication system comprising a terminal device and a communication device, wherein
the terminal device comprises:
a display unit;
a processor; and
a memory storing computer-readable instructions therein, wherein the computer-readable instructions are received from a server storing the computer-readable instructions via the internet by the terminal device, the computer-readable instructions, when executed by the processor, causing the terminal device to:
control a display unit of the terminal device to display a designation screen including a designation area and a button, the designation area being for designating wireless setting information for establishing a second wireless connection between a communication device different from the server and a target access point, the button being a button to be selected after the designation of the wireless setting information; and in a case where the button in the designation screen is selected after the designation of the wireless setting information, send a request to the communication device by using a first wireless connection established between the terminal device and the communication device, the request being sent by using first address information of the communication device as a destination, the first address information being included in the computer-readable instructions, the request including the wireless setting information and a connection command, the connection command being for causing the communication device to establish the second wireless connection by using the wireless setting information, the communication device comprises:

a processor; and a memory storing computer-readable instructions therein, the computer-readable instructions, when executed by the processor, causing the communication device to:

receive the request from the terminal device by using the first wireless connection; and establish the second wireless connection with the target access point in accordance with the wireless setting information and the connection command which are included in the request.

* * * * *